(12) United States Patent
Bae et al.

(10) Patent No.: US 6,983,416 B1
(45) Date of Patent: Jan. 3, 2006

(54) SYSTEM AND METHOD FOR COOPERATIVE EDITING OF WEB DOCUMENT

(75) Inventors: Jin-Hak Bae, Taejon (KR); Jae-Young Lee, Taejon (KR); Doo-Hyeon Kim, Taejon (KR); Seung-Ku Hwang, Taejon (KR)

(73) Assignee: Electronics and Telecommunications Research Institute, (KR)

( * ) Notice: Subject to any disclaimer, the term of this patent is extended or adjusted under 35 U.S.C. 154(b) by 761 days.

(21) Appl. No.: 09/685,406

(22) Filed: Oct. 9, 2000

(30) Foreign Application Priority Data

Apr. 4, 2000 (KR) .............................. 2000-17512

(51) Int. Cl.
*G06F 17/00* (2006.01)
(52) U.S. Cl. ...................... 715/530; 715/526; 705/6; 709/205
(58) Field of Classification Search ................ 715/530, 715/526, 512; 707/203, 204; 705/6; 709/205
See application file for complete search history.

(56) References Cited

U.S. PATENT DOCUMENTS

| | | | | |
|---|---|---|---|---|
| 5,861,880 A | * | 1/1999 | Shimizu et al. | 715/500.1 |
| 6,223,212 B1 | * | 4/2001 | Batty et al. | 709/204 |
| 6,240,444 B1 | * | 5/2001 | Fin et al. | 709/205 |
| 6,327,611 B1 | * | 12/2001 | Everingham | 709/206 |
| 6,446,093 B2 | * | 9/2002 | Tabuchi | 707/205 |
| 6,725,221 B2 | * | 4/2004 | Murakami et al. | 707/10 |

* cited by examiner

*Primary Examiner*—Stephen Hong
*Assistant Examiner*—M. Ludwig
(74) *Attorney, Agent, or Firm*—Blakely, Sokoloff, Taylor & Zafman

(57) ABSTRACT

In a cooperative computer based system for editing a web document including a plurality of clients a server, the cooperative computer based system includes means for generating editing instructions, converting editing instructions to a message related to editing and transmitting the message related to editing to the server; means for determining if the web document can be modified, based on the message related to editing; modifying contents of a copied web document stored in the server in conform to the message related to editing; and transmitting the message related to editing to the plurality of the clients; and means for modifying contents of the copied web document stored in each of the plurality of the clients in conform to the message related to editing transmitted from the server.

12 Claims, 10 Drawing Sheets

FIG. 3

```
<img width=230 height=33 src="http://us.a1.yimg.com/us.yimg.com/a/pr/promo/pepsi/hp_pepsi3.gif" alt="Drink Pepsi & Dew. Get Stuff" border=0></a></td> 7
<td align=center width=205> 8
<img src="http://us.i1.yimg.com/us.yimg.com/i/new2.gif"height=11 width=28> Play free<br> 9
<a href="http://www.yahoo.com/r/fo">football news sports yahoo com</a> 10
<b>Fantasy Football</b></a></td></tr><tr><td colspan=3 align=center> 11
<input size=30 name=p> 12
<input type=submit value=Search> 13
<a href=http://www.yahoo.com/r/so>advanced search</a></td></tr><table> 14
<table border=0 cellspacing=0 cellpadding=3 width=640> 15
<tr><td nowrap align=center><small> 16
```

SYSTEM AND METHOD FOR COOPERATIVE EDITING OF WEB DOCUMENT

FIELD OF THE INVENTION

This invention relates to a system and a method for cooperative editing of a web document using a personal computer (PC), wherein a plurality of editors are coupled to a network, and to a computer-readable record media to store instructions for performing the method; and, more particularly, to a system and a method for cooperative editing of a web document by producing a cooperative editing session having a formation of client/server.

DESCRIPTION OF THE PRIOR ART

An apparatus for cooperative editing of a web document is designed hierarchically, divided into a T.120 protocol stack, the web document controller and a user interface. The T.120 protocol stack serves a data transmission and a production and control of cooperative editing session. The web document controller serves to process editing instructions and synchronize the instructions, so that all editors can keep a copy of the same web document. The user interface serves to produce the editing instructions and display a modified web document.

There are some conventional methods for cooperative editing. The conventional methods include an application program sharing or a shared white board, et al. By the method for cooperative editing with an application program sharing, the application program on the display is shared but only one editor is endowed with an authority to edit. By the method for cooperative editing with a shared white board, an authority is open to all editors, so that text or image can be added/deleted in the cooperative area. By the former method, all the types of media can be edited, however, cooperative editing is performed using a function of sharing the application program, such that the editors cannot work for editing at the same time. By the latter method, it is impossible to edit a text document. Thus, there is a problem that these two methods do not provide enough function for cooperative editing.

SUMMARY OF THE INVENTION

It is an object of the present invention to provide a system and a method for cooperative editing a web document, wherein a plurality of editors can edit the web document cooperatively at the same time by executing the system for cooperative editing the web document on each terminal coupled to a network.

It is another object of the present invention to provide a computer-readable record media performing the method.

In accordance with an aspect of the present invention, there is provided, in a cooperative computer based system for editing a web document including a plurality of clients and a server, the cooperative computer based system including: a) means for generating editing instructions, converting data format of editing instructions to the data format for a message related to editing and transmitting the message related to editing to the server; b) means for determining if the web document can be modified, based on the message related to editing; modifying contents of a copied web document stored in the server in conform to the message related to editing; and transmitting the message related to editing to the plurality of the clients; and c) means for modifying contents of the copied web document stored in each of the plurality of the clients in conform to the message related to editing transmitted from the server.

In accordance with another aspect of the present invention, there is provided, in a cooperative computer based system for editing a web document including a server and a plurality of clients, a computer-readable record media storing instructions for performing a method for editing a web document cooperatively, comprising the steps of: a) at a client among the plurality of the clients, generating editing instructions, converting data format of editing instructions to the data format for a message related to editing and transmitting the message related to editing to the server; b) at the server, determining if the web document can be modified, based on the message related to editing; modifying contents of a copied web document stored in the server in conform to the message related to editing; and transmitting the message related to editing to the plurality of the clients; and c) modifying contents of the copied web document stored in each of the plurality of the clients in conform to the message related to editing transmitted from the server.

BRIEF DESCRIPTION OF THE DRAWINGS

Other objects and aspects of the invention will become apparent from the following description of the embodiments with reference to the accompanying drawings, in which:

FIG. 3 is a pictorial representation in a window when executing a cooperative editing apparatus;

DETAILED DESCRIPTION OF THE PREFERRED EMBODIMENTS

Figure 1:
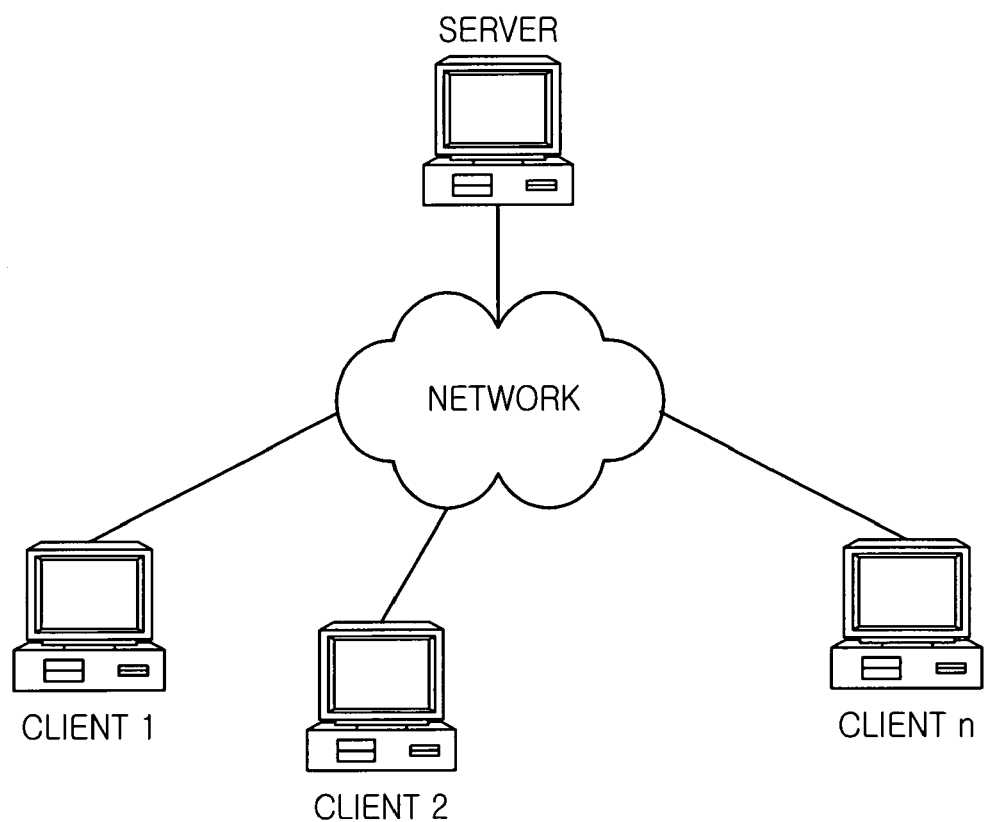
FIG. 1 is a pictorial representation of a structure of a cooperative editing system in accordance with the present invention.

As shown in FIG. 1, one server must be in one session, in accordance with a definition that all functions operate in the environment of client/server. A server receives all editing messages generated in the cooperative editing session and distributes them to editors. A computer in which a web document to be edited is opened first and a session is generated, determines if a server token is in the session. If the server token is available, the computer becomes a server by acquiring the server token.

Generally, the server serves as a server until the session ends. However, in case of changing servers of the session, the server token is handed over to another client. A new server taking over the server token, informs all computers in the session that it has become the new server. Since the server is distinguished from the client by having the server token, it does not happen that more than one server are in one session.

Each editor has an authority to editing within an area assigned to it and no authority beyond the area. Generally, web site managers and web designers, et al., have the authority within wide area assigned to them. On the contrary, sponsors and contents providers have the authority within a little area. A session manager controls the authority to editing, that is, the session manager has the authority to editing within all area of a web document and can assign the authority to the editors. The session manager makes, deletes, and stores files and manages users in the cooperative editing session.

Figure 2A:
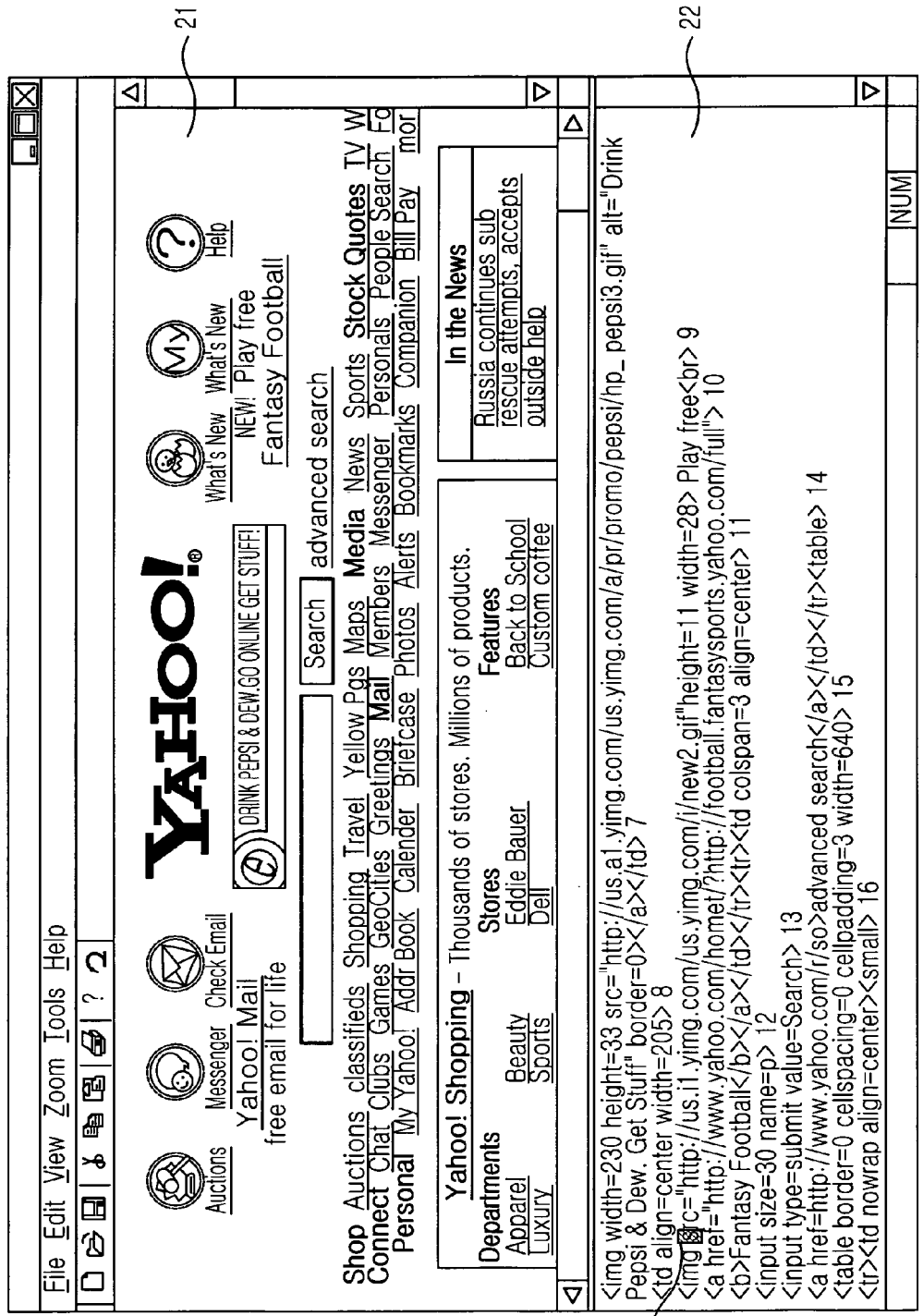
FIG. 2A is a pictorial representation of a window when executing a cooperative editing apparatus.

As shown in FIG. 2A, a window of a cooperative editing apparatus is divided into two windows. One is used for WYSIWYG editing window 21 for editing in the WYSIWYG form, and the other is used for text editing window 22 for editing in the text form. Editing is performed on each window, and when contents are edited on the WYSIWYG editing window, the same edited contents are maintained on the text-editing window. In FIG. 3, a reference numeral 23 denotes the editor's caret used to edit the text.

Figure 2B:
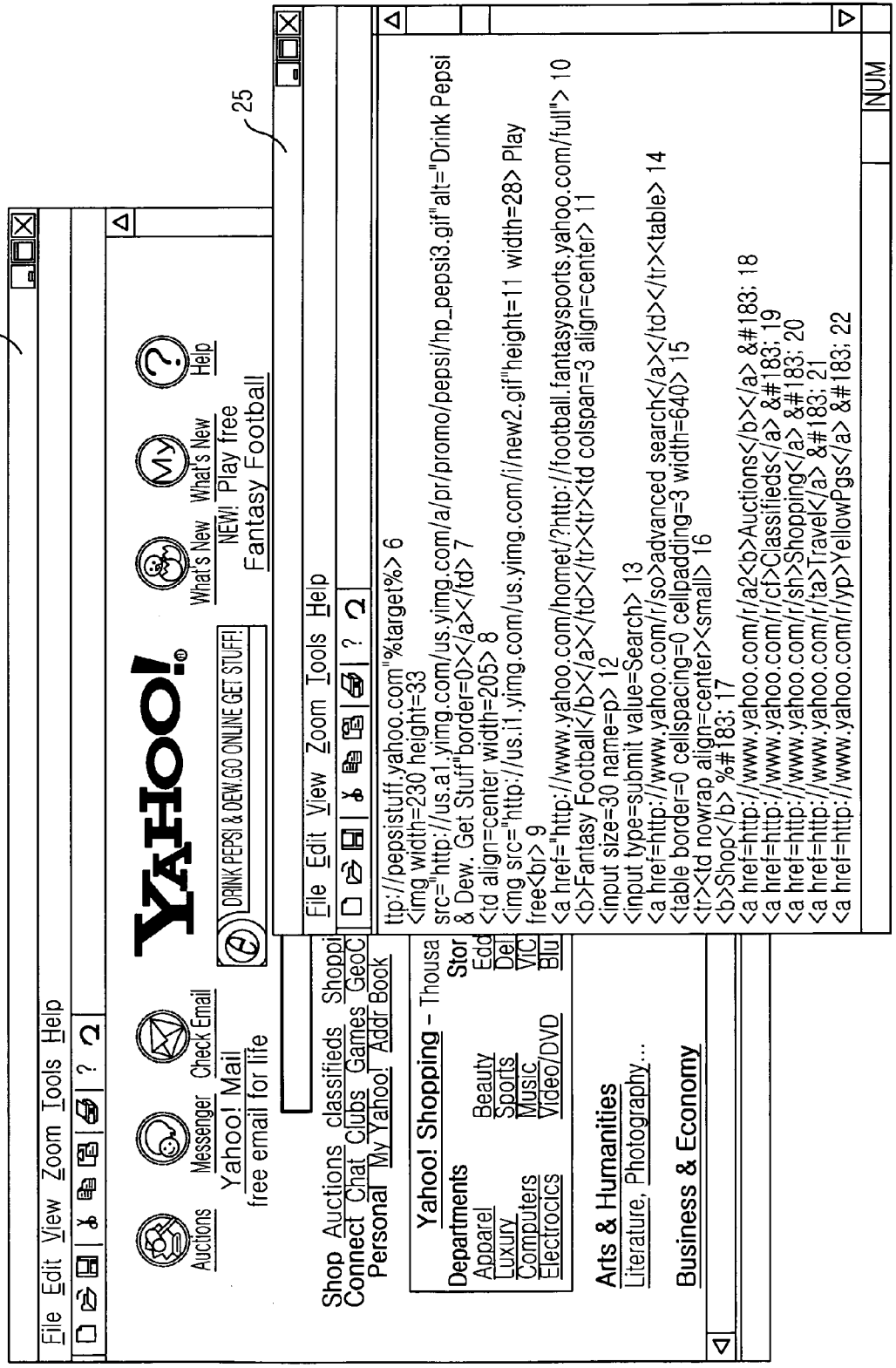
FIG. 2B is another pictorial representation of a window when executing a cooperative editing apparatus.

Referring to FIG. 2B, when executing the cooperative editing apparatus, two windows independently controlled, are generated. For example, a reference numeral 25 denotes a window displaying a web document text and a reference numeral 24 denotes a window displaying a result of rendering the web document. The web document text window 25 is the same as the text-editing window 22. Two windows 25 and 24 are executed by two methods.

One is a method that, as can be seen in FIG. 2B, both a WYSIWIG editing and a text editing can be executed as a single application by executing a WYSIWYG window built-in in the cooperative editing apparatus.

The other is a method that only a result of editing is informed by executing a general web browser. At this time, the WYSIWIG editing is impossible but the text editing is possible. And each time contents of a web document being edited are modified, it is required to inform the web browser of this modification. To do so, it is required to store the web document being edited in the web document form and transmit a message to the web browser, so that the web browser can read this file. At this time, in case of editing a web site directly, it is required to convert a uniform resource locator (URL) included in the web document to an absolute address form commencing with http://, so that the web browser can bring and read pictures from the web site directly. In case of cooperatively editing a web document stored in a local disk, it is required to copy to provide all picture files to a client, so that the client can edit the web document by providing the same environment as the local disk of the server. Naturally, it is possible to use a method of editing the web document on the two windows and then informing the web browser of contents by using two methods mentioned above together.

In FIG. 3, a reference numeral 31 denotes an editor's caret and a reference numeral 32 an area which an editor requests. This area 32 is protected from the other editors until the editor or the session manager releases a Lock on the area. Since the editor's authority to editing is limited by line, the editor can do lock and edit the limited lines allowed to be edited. The editor distinguishes the area of his locking from the area of the other editor's locking by a color difference between his text and the other's. A reference numeral 33 denotes a line number used for discerning between each line.

In accordance with the present invention, one instant number is given to one line and the server controls this instant number. When a line is added, the server gives this line a new instant number. When a line is deleted, also a corresponding instant number is deleted. When a line is modified, a corresponding number is not changed.

Figure 4:
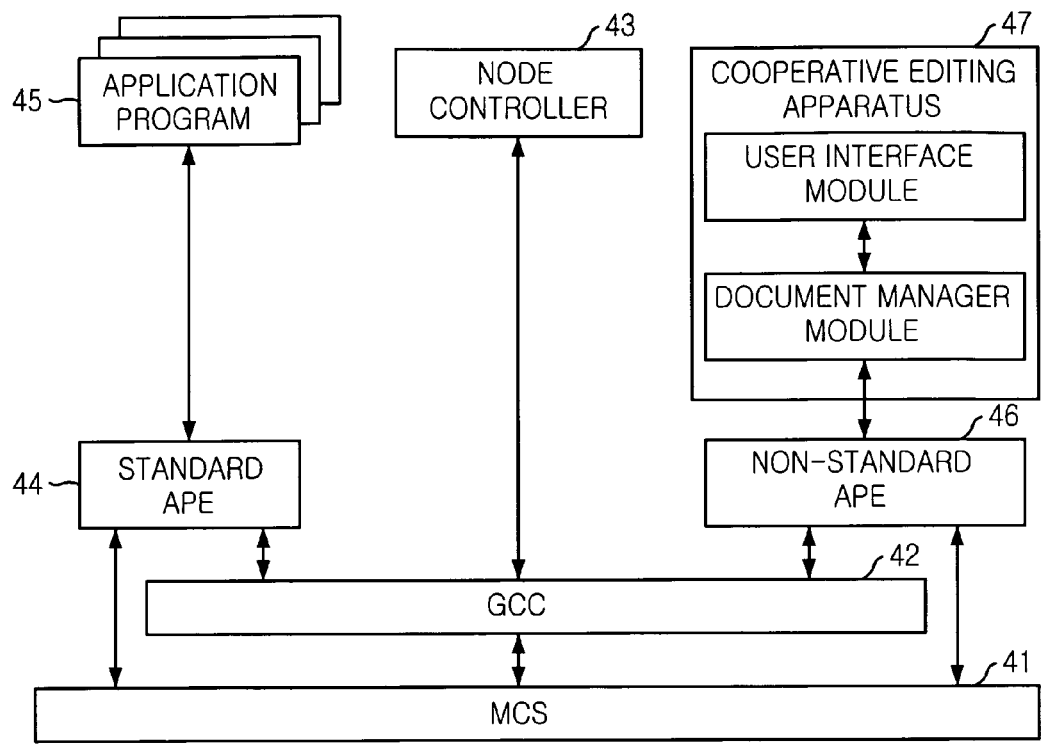
FIG. 4 is a schematic diagram illustrating a relationship between a cooperative editing apparatus and T.120 protocol stack.

Referring to FIG. 4, before executing the cooperative editing apparatus, T.120 protocol stack must be executed, because an application program 45 of T.120 operates the cooperative editing apparatus. The T.120 protocol stack for a multimedia data conference includes a multipoint communication service (MCS) 41, a generic conference control (GCC) 42 and a node controller (NC) 43. The MCS 41 transmits data and controls a resource. The GCC 42 controls a conference and a session. The NC 43 generates, maintains and controls the conference by using the T.120 protocol stack. The MCS 41 and the GCC 42 respectively have a standard of T.122/125 and T.124, however, the NC 43 has no standard. A white board, a file transmission, an application program sharing and a chatting are application programs 45 usable during the conference and these programs have a standard of T.126, T.127, T.128 and T.134 respectively.

A standard APE 44 is a method for transmitting data between peer application programs, and has a standard of T.121. The web document cooperative editing apparatus 47 uses a non-standard APE 46, in order to exchange data between apparatus. Modifying the standard APE 44 generates the non-standard APE 46 suitable for cooperative editing. Also, while executing the web document cooperative editing apparatus, T.120 application programs, for example, of a file transmission, a chatting and a white board are usable, such that it is possible to transmit a file for editing and to exchange an opinion about editing by using these application programs.

Figure 5:
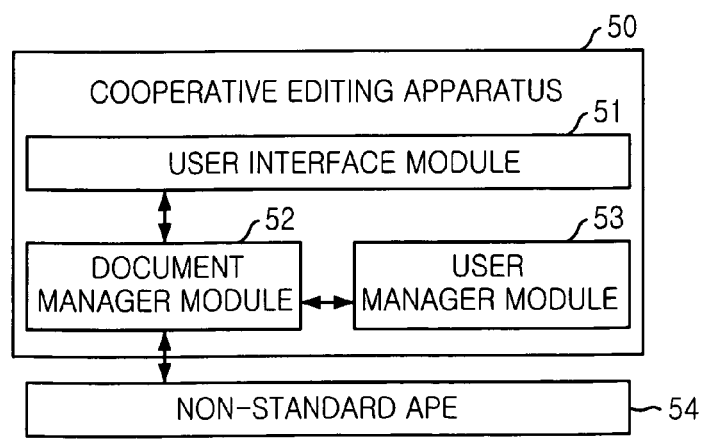
FIG. 5 is a block diagram illustrating a cooperative apparatus for editing a web document in accordance with the present invention.

Referring to FIG. 5, the web document cooperative editing apparatus 50 includes a user interface module 51, a web document manager module 52 and a user manager module 53. The user interface module 51 visualizes the web document by parsing the web document and provides an editing environment of WYSIWYG form. The web document manager module 52 performs a plurality of functions related to editing. The user manager module 53 controls information of users participating in editing, when the web document cooperative editing apparatus operates as a server.

In more detail, the web document manager module 52 includes the functions of: converting the read web document to an internal form for cooperative editing; analyzing an editing message upon arrival of the editing message and then determining if editing instructions are correct, and performing editing; converting editing instructions to message form in order to transmit the editing instructions to the other editors; and informing the user interface module 51, when contents of the web document are modified.

The user manager module 53 also determines if a user is allowed to access by inspecting his/her ID and password when the user logs in.

Figure 6:
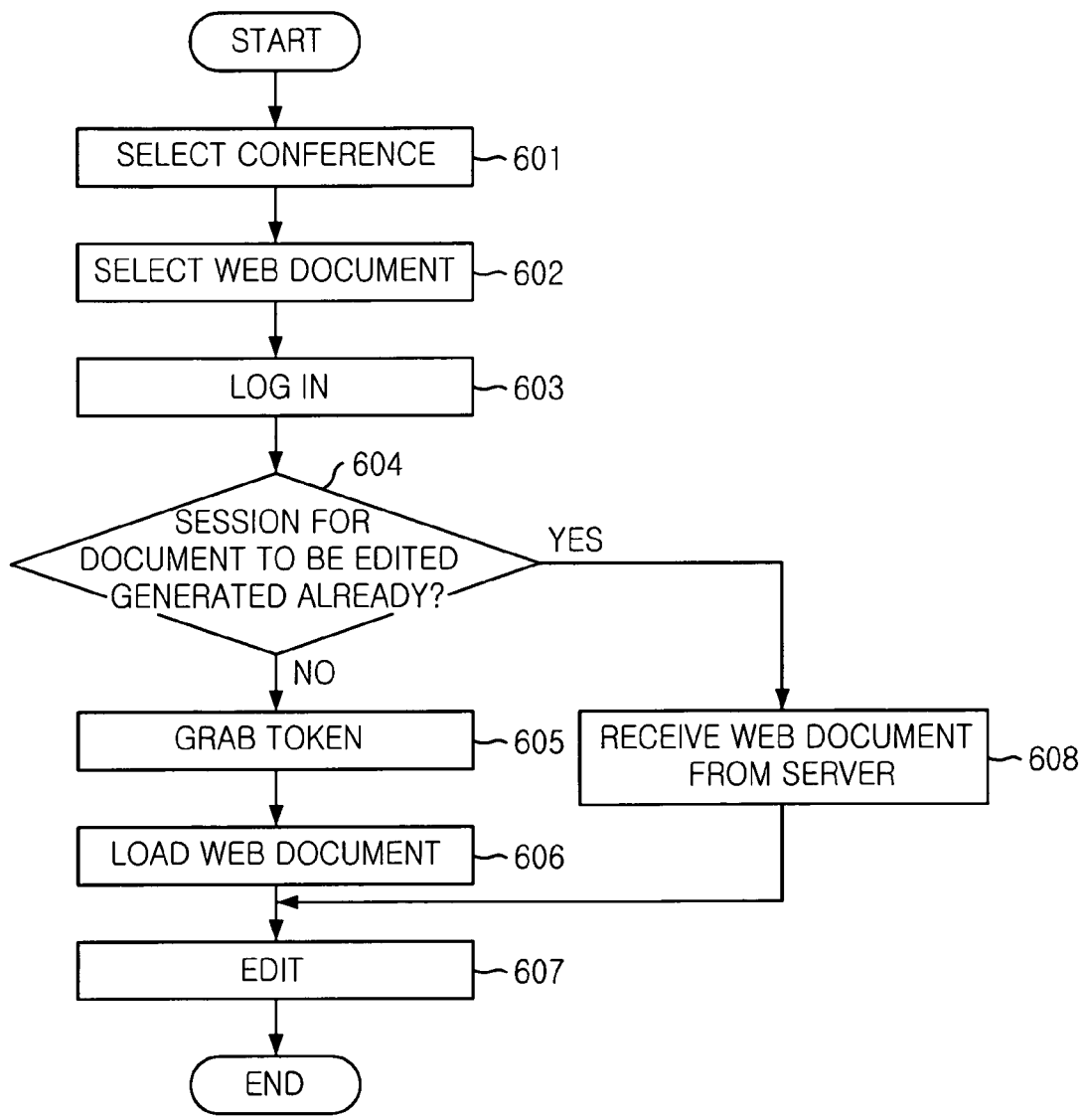
FIG. 6 is a flow chart representing a process of commencing cooperative editing according to a method for cooperative editing of a web document in accordance with the present invention.

Referring to FIG. 6, it is required to execute the T.120 protocol stack and generate a conference before executing the web document cooperative editing apparatus. In some case, there might be proceeding a plurality of conferences in one computer, and thus it is required to select a conference out of those conferences to thereby participate in the conference at step 601. More concretely describing, since the presently proceeding conferences are distinguished by each name, the editor can participate in the conference by selecting a name of a desired conference.

After selecting the conference, a web document to be edited is selected at step 602. That is, the desired web document is selected in list of web documents available for cooperative editing. And then, the user logs in at step 603. In the cooperative editing, log in serves to distinguish a session manager from a general editor and determine if an editor has an authority to editing the web document.

Next, determine if a session for the web document to be edited was already generated at step 604.

If the session was not yet generated, the user generates the session by becoming a server after grabbing a token at step 605. In order to grab the token, the web document cooperative editing apparatus needs to request the T.120 MCS of the token. After loading the web document at step 606, the logic flow proceeds to step 607 to start cooperative editing.

If the session was already generated, the logic flow proceeds to the step 607 to start cooperative editing after receiving the web document from the server as a client at step 608. Upon receiving the web document from the server, information of the web document location, editors' authority to editing and a Lock is transmitted. For, locating the web document brings pictures, et al., from a uniform resource locator (URL) in the web document. In case of receiving the web document stored in the hard disk, the editor receives picture files, et al., included in the web document and stores them in the editor's local disk.

Figure 7:
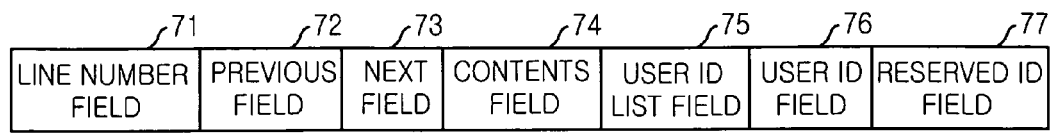
FIG. 7 is a data structure representing a line in case a web document is converted into an internal form.

Referring to FIG. 7, the web document cooperative editing apparatus converts the web document to a doubly linked list for managing it. One node in the list is configured to represent one line of the web document and information necessary for editing is stored in each node.

Hereinafter, a process of converting the web document to the internal form will be described. The process happens only in the server, and clients receive the web document, a form of which was converted into the list in the server. By using the web document converted into the list, all editors participating in the session can maintain the same contents.

In order to perform as above, after reading the web document and dividing it by line, the apparatus stores contents of the line in a contents field 74 of the node.

Second, after numbering each line, the apparatus stores a number assigned to the line in the line number field 71. Each line is distinguished by each number in corresponding line number fields and is maintained as the same to all clients participating in the cooperative editing.

Third, user ID fields 76 of editors having authority to editing this node are stored in the form of list. A place of storage is a user ID list field 75. A user unregistered in the user ID list field 75 cannot edit this node. In order to register in the user ID list field 75, the unregistered user needs to request the session manager of registration. The request can be made before editing or while editing. In case this list is in a NULL state, all editors have authority to editing.

Fourth, a previous field 72 and a next field 73 contain value of a previous node and a next node, respectively.

Fifth, the other fields not described above are set to initial value of "0".

Upon completing the node list, cooperative editing proceeds. If a certain editor edits, a user ID of the editor who edited this node is stored in the user ID field 76 of corresponding node. If this field has a value of "0", contents of a file have never been modified since the file was read for the first time.

There is a case that an editor intending to edit this node requests Lock, so that the other editors cannot edit. In this case, the user ID of the editor who requested the lock is stored in a reserved user ID field 77. Ones who can request the lock are just editors registered in the user ID list field 75 and a manager. If the lock request is released, the reserved user ID field 77 has a value of "0".

Figure 8:
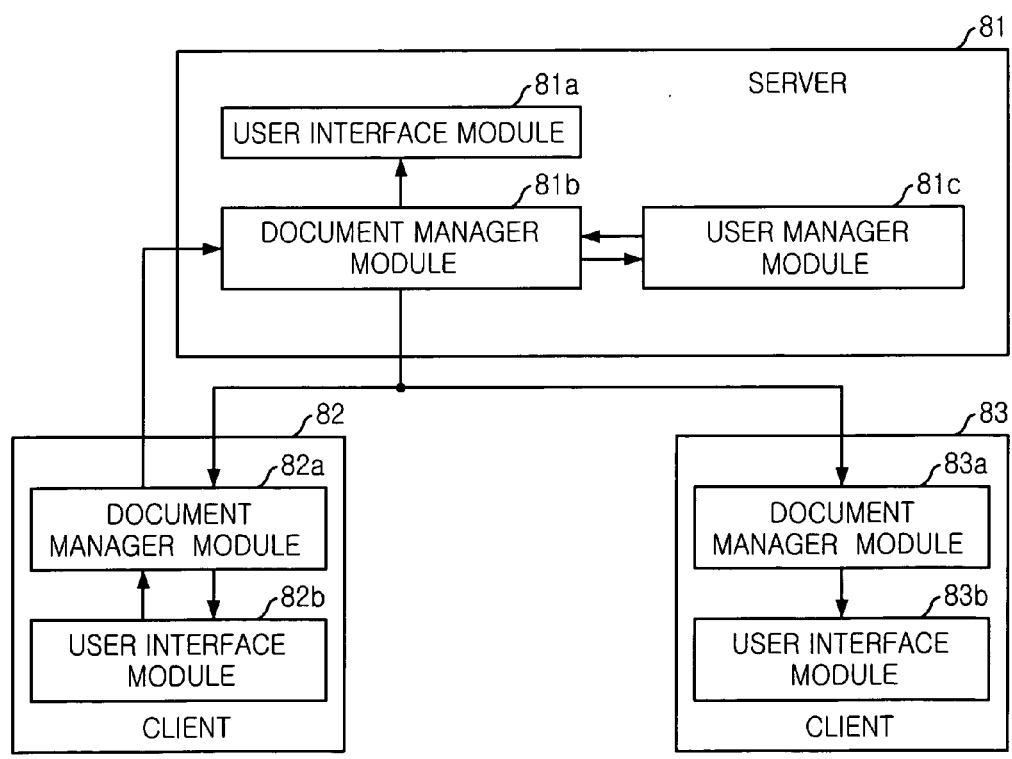
FIG. 8 is a block diagram representing a process of processing editing instructions according to a method for a web document editing in accordance with the present invention.

Referring to FIG. 8, supposing that a client 82 edited a portion of the web document, a user interface module 82*b* inspects a keyboard input or a mouse input of the editor, converts the inputs through the mouse or keyboard to editing instructions and then transmits them to a web document manager module 82*a*. At this time, the user interface module 82*b* does not show modified contents on the display.

The web document manager module 82*a* determines if the received instructions are correct, and if correct, converts the instructions to a message and transmits a server 81 the converted message. The web document manager module 81A in the server 81 receives the converted message, and determines if the editor has an authority to editing and if the other editor requested Lock. If it is confirmed that the editor has the authority, the web document manager module 81B modifies contents of the web document and informs a user interface module 81*a* that the contents were modified. Then, the user interface module 81A of the server 81 shows the contents on the display in accordance with the modified contents.

Continuously, the web document manager module 81B informs the user interface module 81A of the contents modification and converts the modified contents to a message and transmits a converted message to clients 82 and 83. After receiving the converted message from the web document manager module 81*b* of the server 81, document manager modules 82*a* and 83A of the clients 82 and 83 modify their copies of the web document respectively in accordance with the received message, and informs user interface modules 82*b* and 83B that contents were modified. Then, finally, the client 82 performs showing the modified contents on its display.

In this case, there is a possibility of a little time delay between the client's editing and confirming actually the edited contents. There is a difference in the time delay, depending on a state of network and a hardware performance of server/client system.

Figure 9A:
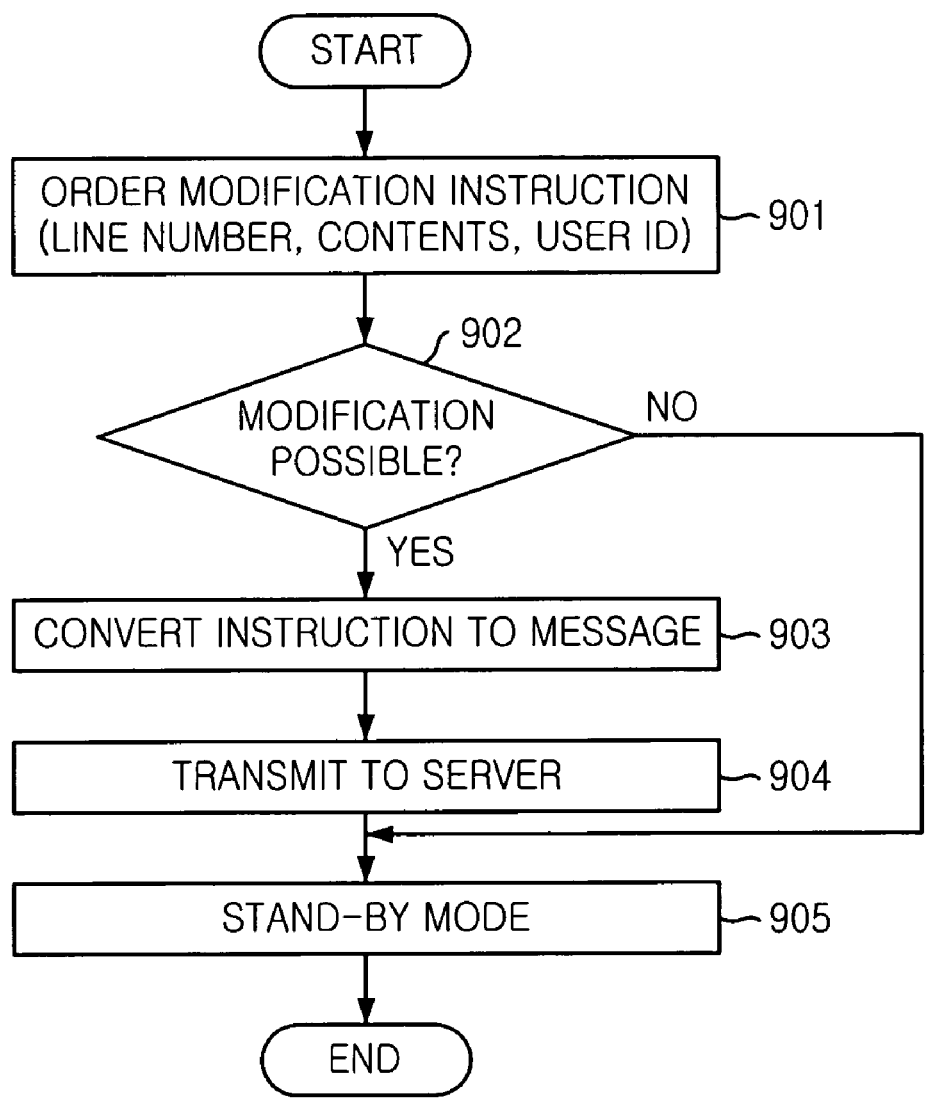
FIG. 9A is a flow chart representing a process of processing editing instructions at a client according to a method for a web document editing in accordance with the present invention.

Referring to FIG. 9A, in accordance with the present invention, editing instructions of the web document includes a modification, an insert, a deletion, a division and a combination.

When a user orders an instruction for modifying in order to edit a specific area in the web document 901, this instruction is transmitted to a web document manager module. At this time, a line number, modified contents and the user ID are transmitted. After receiving this instruction, the web document manager module determines if modifying is possible 902. If the others performed Lock or the user has no authority to editing, this instruction will not be performed. If modifying is possible, the client converts the received instruction to a message at step 903 and transmits the converted to the server at step 904 and gets in a stand-by mode at step 905. If modifying is not possible, the client gets in the stand-by mode immediately.

Figure 9B:
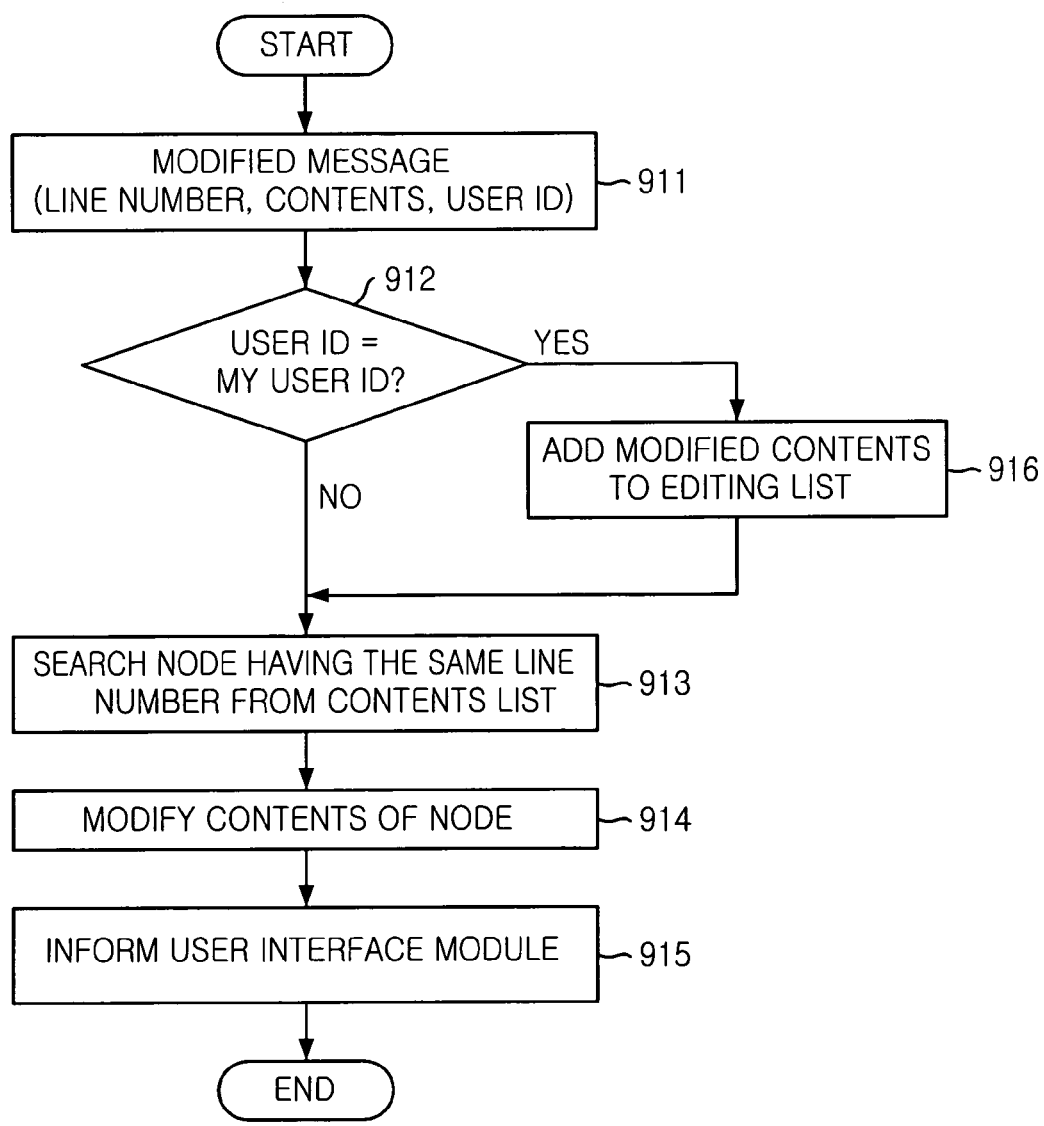
FIG. 9B is a flow chart representing a process of processing an editing message at a client according to a method for a web document editing in accordance with the present invention.

Referring to FIG. 9B, if the client receives a modified message including line number, modified contents and a user ID, it compares the user ID included in the message with My User ID at step 912. Here, the My User ID denotes the ID of the user him/herself and is used to be compared with the user ID contained in the modified message. If the user ID is not equal to My User ID, the client determines if a node of the same line number is in the contents list that the client retains at step 913.

Continuously, after modifying contents of the node at step 914, the client informs the user interface module that the contents were modified at step 915. That is, the user interface can modify even contents of its own editing, only when an edited message is received from the server. There are two lists that the user manages. One is an editing list, in which he stores the contents of his editing, in sequence and performs a function of undoing. And the other one is a contents list. The contents list is a doubly linked list of the nodes described in FIG. 7 and systems of all editors hold the same contents in their contents lists.

A way of processing the other instructions is similar to that of modifying. In case of inserting, the client searches a node of the same line number in the list and inserts a node next to the searched node. In case of deletion, the client searches a node of the same line number, and deletes the searched node.

If the user ID is the same as My User ID, it means that the message is the one that the editor itself transmits. In this case, after adding these modified contents to the editing list at step 916, the logic flow proceeds to the step 913 of searching a node of the same line number in the contents list.

Figure 10:
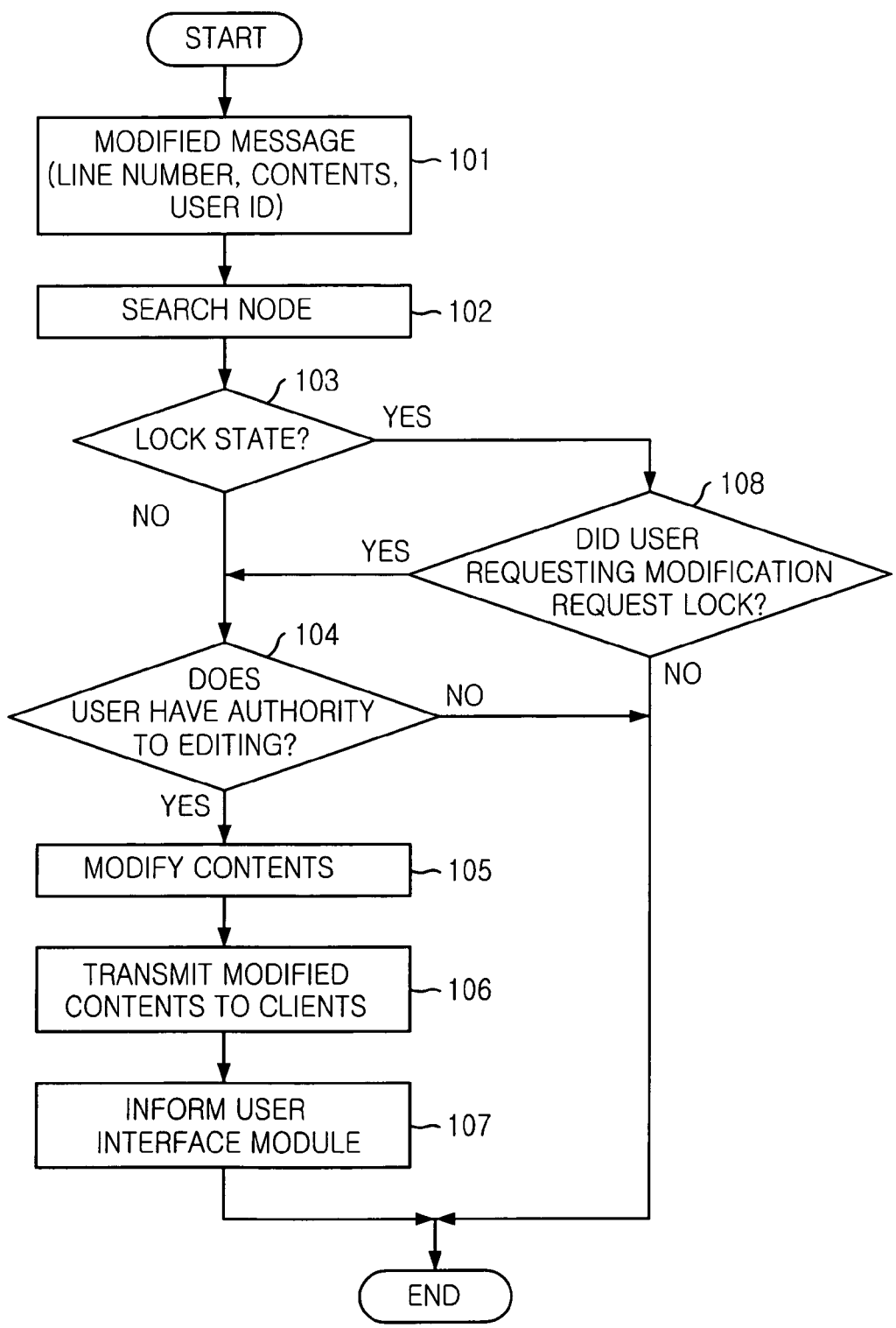
FIG. 10 is a flow chart representing a process of processing an editing message at a server according to a method for a web document editing in accordance with the present invention.

As shown in the FIG. 10, a server handles a message received from a client. When receiving a modified message including a line number, modified contents and a user ID from the client at step 101, the server searches a corresponding node in the contents list at step 102.

And, it determines if this node is in a state of Lock at step 103. If the node is not in the state of the lock, the server determines if the user has an authority to editing at step 104, and if not, the server does not handle the modified message, otherwise the server modifies the contents at step 105 and transmits the modified contents to the client at step 106. Then, the user interface is informed of the modified contents, and the contents are shown on the display at step 107.

If the node is in the state of the lock, the server determines if the user, who requests modification, requested the lock at step 108, and if not, the server does not handle the modified message, otherwise the logic flow proceeds to the step 104 where the server determines if the user has an authority to editing.

Although the preferred embodiments of the invention have been disclosed for illustrative purpose, those skilled in the art will appreciate that various modifications, additions, and substitutions are possible, without departing from the scope and sprit of the invention as disclosed in the accompanying claims.

What is claimed is:

1. A cooperative computer based system including a plurality of clients and a server for editing a web document, the cooperative computer based system comprising:
   a first user interface module in each of the plurality of the clients for generating editing instructions by receiving data from a user;
   a first document manager module in each of the plurality of the clients for converting the editing instruction into a message and transmitting the message, and modifying a copy of the web document and informing a modification of the copy to the first user interface module;
   a second document manager module in the server for modifying contents of the web document by receiving the message from the first document manager module; and
   a second user interface module in the server for transmitting and informing a modification of the web document to the first document manager,
      wherein the second document manager module of the server includes:
      means for receiving the message related to editing from the first document manager module;
      means for determining if a lock is requested for the web document;
      means for determining if the user has an authority to edit the web document;
      means for modifying contents of the web document edited by the user, if the user has an authority to edit the web document;
      means for informing the second user interface module that the second document manager module completed modifying the contents of the web document;
      means for converting the modified contents of the web document to a message related to editing to be transmitted to the plurality of the clients; and
      means for transmitting the message related to editing to the first document manager module of the plurality of the clients.

2. The cooperative computer based system as recited in claim 1, wherein the first user interface module includes:
   means for converting data received from a user to editing instructions when at least one of the plurality of clients edits the web document; and
   means for transmitting the editing instructions to the first document manager module.

3. The cooperative computer based system as recited in claim 2, wherein each first user interface module of the plurality of the clients includes means for displaying the modified contents, upon being informed that it is completed that the contents of each coped web document are modified.

4. The cooperative computer based system as recited in claim 1, wherein the first document manager module includes:
   means for determining if the editing instructions are correct;
   means for converting the editing instructions to the message related to editing which can be received by the plurality of the clients, if the editing instructions are correct; and
   means for transmitting the message related to editing to the second document manager module.

5. The cooperative computer based system as recited in claim 4, wherein each first document manager module of the plurality of the clients includes:
   means for modifying each copied web document stored in the plurality of the clients conforming to the modified contents, based on the message related to editing transmitted from the second document manager module of the server; and
   means for informing each first user interface module of the plurality of the clients that it is completed that the contents of each copied web document are modified.

6. The cooperative computer based system as recited in claim 1, wherein the second user interface module of the server includes means for displaying the modified contents of the web document.

7. The cooperative computer based system as recited in claim 1, wherein the second user manager module of the server includes:
- means for managing information about users to participate in cooperative editing; and
- means for determining if the user is allowed to edit by checking an identification and a password of the user, when the user logs in.

8. A method for cooperative editing of the web document in a cooperative computer based system including a server and a plurality of clients, the method comprising the steps of:
- a) at a client, generating editing instructions, converting editing instructions to a message related to editing and transmitting the message related to editing to the server;
- b) at the server, if the web document can be modified, modifying contents of a copied web document stored in the server conforming to the message related to editing; and transmitting the message related to editing to the plurality of the clients; and
- c) modifying contents of the copied web document stored in each of the plurality of the clients conforming to the message related to editing transmitted from the server, wherein the step a) includes the steps of:
  - a1) at the client, determining if it is possible to modify the web document, based on the editing instructions;
  - a2) disregarding the editing instructions if a portion of the web document to be modified is requested to be in a lock state by other users or the user has no authority to edit the document; and
  - a3) if the portion of the web document to be modified is not requested to be in the lock state by other users and the user has the authority to edit, converting the editing instructions to the message related to editing and transmitting the message related to editing to the server.

9. The method as recited in claim 8, wherein a line number, modified contents and a user identification (ID) are included in the message related to editing.

10. The method as recited in claim 9, wherein the step b) includes the steps of:
- b1) searching a node having a line number equal to the line number included in the message related to editing from contents list of the server;
- b2) determining if the node is in the lock state;
- b3) if the node is not in the lock state, determining if the user has the authority to editing, and otherwise, determining if the lock is requested by the user who modified the contents;
- b4) if the user has the authority to editing, modifying the contents included in the node and then informing a user interface module of the server that the contents are modified;
- b5) converting the modified contents to the message related to editing and transmitting the message related to editing to the plurality of the clients;
- b6) if the lock is requested by the user who modified the contents, going to the step b3); and
- b7) disregarding the message related to editing if the lock is not requested b the user who modified the contents or if the user has no authority to editing.

11. The method as recited in claim 10, wherein the step c) includes the steps of:
- c1) determining if a my user ID indicating an ID of the user who modified the contents is equal to the user ID contained in the message related to editing received from the server;
- c2) if the my user ID is not equal to the user ID, searching the node having a line number equal to the line number from the contents list of each of the plurality of the clients;
- c3) modifying contents included in the node and informing the user interface module of each of the plurality of the clients that the contents are modified;
- c4) at the user interface module of each of the plurality of the clients, displaying the modified contents; and
- d5) if a my user ID is equal to the user ID, storing the modified contents in an editing list included in the client of the user who modified the contents and then going to the step c2).

12. A computer-readable record media storing instructions for performing a method for editing a web document cooperatively in a cooperative computer based system including a server and a plurality of clients, the method comprising the steps of:
- a) at a client among the plurality of the clients, generating editing instructions, converting editing instructions to a message related to editing and transmitting the message related to editing to the server;
- b) at the server, determining if the web document can be modified, based on the message related to editing; modifying contents of a copied web document stored in the server conforming to the message related to editing; and transmitting the message related to editing to the plurality of the clients; and
- c) modifying contents of the copied web document stored in each of the plurality of the clients conforming to the message related to editing transmitted from the server, wherein the step a) includes the steps of:
  - a1) at the client, determining if it is possible to modify the web document, based on the editing instructions;
  - a2) disregarding the editing instructions if a portion of the web document to be modified is requested to be in a lock state by other users or the user has no authority to edit the document; and
  - a3) if the portion of the web document to be modified is not requested to be in the lock state by other users and the user has the authority to edit, converting the editing instructions to the message related to editing and transmitting the message related to editing to the server.

* * * * *